United States Patent
Kim et al.

(10) Patent No.: US 10,241,684 B2
(45) Date of Patent: Mar. 26, 2019

(54) SYSTEM AND METHOD FOR HIGHER ORDER LONG SHORT-TERM MEMORY (LSTM) NETWORK

(71) Applicant: Samsung Electronics Co., Ltd., Gyeonggi-do (KR)

(72) Inventors: Jaeyoung Kim, San Diego, CA (US); Inyup Kang, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 163 days.

(21) Appl. No.: 15/480,086

(22) Filed: Apr. 5, 2017

(65) Prior Publication Data
US 2018/0196599 A1    Jul. 12, 2018

Related U.S. Application Data

(60) Provisional application No. 62/445,330, filed on Jan. 12, 2017.

(51) Int. Cl.
*G06F 3/06* (2006.01)
*G06N 3/04* (2006.01)
*G06N 3/08* (2006.01)

(52) U.S. Cl.
CPC .......... *G06F 3/061* (2013.01); *G06F 3/067* (2013.01); *G06F 3/0655* (2013.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,015,093 | B1 | 4/2015 | Commons |
| 9,336,482 | B1 * | 5/2016 | Corrado ............... G06N 3/0445 |
| 9,508,340 | B2 * | 11/2016 | Parada San Martin ...................... G06F 1/3203 |
| 9,792,897 | B1 * | 10/2017 | Kaskari .................. G10L 15/20 |

(Continued)

OTHER PUBLICATIONS

Francisco Javier Ordonez et al., "Deep Convolution and LSTM Recurrent Neural Networks for Multimodal Wearable Activity Recognition", Jan. 18, 2016, pp. 1-25, https://www.mdpi.com/1424-8220/16/1/115/htm (Year: 2016).*

(Continued)

*Primary Examiner* — Christopher D Birkhimer
(74) *Attorney, Agent, or Firm* — The Farrell Law Firm, P.C.

(57) ABSTRACT

A method and apparatus are provided. The method includes configuring a plurality of long short term memory (LSTM) networks, wherein each of the plurality of LSTM networks is at a different network layer, configuring a plurality of memory cells in a spatial domain of the plurality of LSTM networks, configuring the plurality of memory cells in a temporal domain of the plurality of LSTM networks, controlling an output of each of the plurality of LSTM networks based on highway connections to outputs from at least one previous layer and at least one previous time of the plurality of LSTM networks, and controlling the plurality of memory cells based on highway connections to memory cells from the at least one previous time.

20 Claims, 4 Drawing Sheets

(56) References Cited

U.S. PATENT DOCUMENTS

| | | | | |
|---|---|---|---|---|
| 9,792,900 | B1* | 10/2017 | Kaskari | G10L 15/20 |
| 2015/0161991 | A1* | 6/2015 | Sak | G10L 15/02 |
| | | | | 704/254 |
| 2015/0340034 | A1* | 11/2015 | Schalkwyk | G10L 15/18 |
| | | | | 704/235 |
| 2016/0034812 | A1* | 2/2016 | Gibson | G06N 3/08 |
| | | | | 706/25 |
| 2016/0035344 | A1* | 2/2016 | Gonzalez-Dominguez | |
| | | | | G10L 15/005 |
| | | | | 704/254 |
| 2016/0098632 | A1* | 4/2016 | Sutskever | G06N 3/0445 |
| | | | | 706/25 |
| 2016/0099010 | A1* | 4/2016 | Sainath | G10L 25/30 |
| | | | | 704/232 |
| 2016/0140435 | A1* | 5/2016 | Bengio | G06F 17/28 |
| | | | | 382/158 |
| 2016/0180838 | A1* | 6/2016 | Parada San Martin | |
| | | | | G06F 1/3203 |
| | | | | 704/232 |
| 2016/0189027 | A1* | 6/2016 | Graves | G06N 3/063 |
| | | | | 706/17 |
| 2016/0210551 | A1* | 7/2016 | Lee | G06F 17/27 |
| 2016/0232440 | A1* | 8/2016 | Gregor | G06N 3/0445 |
| 2016/0243701 | A1* | 8/2016 | Gildert | G05B 19/42 |
| 2016/0247064 | A1* | 8/2016 | Yoo | G06N 3/063 |
| 2016/0284347 | A1* | 9/2016 | Sainath | G10L 15/16 |
| 2016/0299685 | A1* | 10/2016 | Zhai | G06F 3/0219 |
| 2016/0299938 | A1* | 10/2016 | Malhotra | G06F 17/30324 |
| 2016/0313801 | A1* | 10/2016 | Wagner | G06F 3/017 |
| 2016/0322055 | A1* | 11/2016 | Sainath | G10L 15/16 |
| 2016/0342895 | A1 | 11/2016 | Gao et al. | |
| 2016/0350652 | A1* | 12/2016 | Min | G06F 17/24 |
| 2016/0350653 | A1* | 12/2016 | Socher | G06N 3/0445 |
| 2016/0358072 | A1* | 12/2016 | Hermann | G06N 3/0427 |
| 2017/0092297 | A1* | 3/2017 | Sainath | G10L 25/78 |
| 2017/0301342 | A1* | 10/2017 | Kaskari | G10L 15/20 |
| 2017/0301344 | A1* | 10/2017 | Kaskari | G10L 15/20 |
| 2017/0301347 | A1* | 10/2017 | Fuhrman | G10L 15/20 |

OTHER PUBLICATIONS

Derek Monner et al., "A Generalized LSTM-Like Training Algorithm for Second-Order Recurrent Neural Networks", Jan. 2012, pp. 1-37, https://www.ncbi.nlm.nih.gov/pmc/articles/PMC3217173/ (Year: 2012).*

Jimeno-Yepes, Antonio, Higher order features and recurrent neural networks based on Long-Short Term Memory nodes in supervised biomedical word sense disambiguation Journal of Biomedical Samantics, Apr. 12, 2016, pp. 19.

Merelli, Emanuela et al., RNN-based Model for Self-adaptive Systems—The Emergence of Epilepsy in the Human Brain, ResearchGate, Oct. 2014, pp. 7.

* cited by examiner

Form processor that configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time ── 401

Testing processor configured to configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time ── 403

FIG. 4

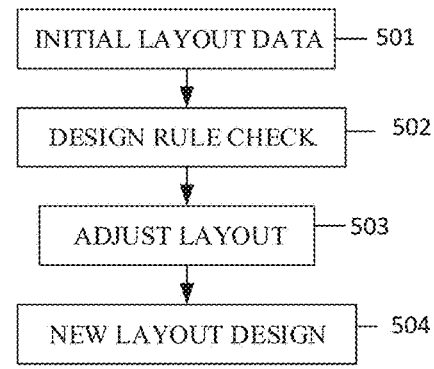

FIG. 5

SYSTEM AND METHOD FOR HIGHER ORDER LONG SHORT-TERM MEMORY (LSTM) NETWORK

PRIORITY

This application claims priority under 35 U.S.C. § 119(e) to U.S. Provisional Patent Application No. 62/445,330 which was filed in the U.S. Patent and Trademark Office on Jan. 12, 2017, the entire content of which is incorporated herein by reference.

FIELD

The present disclosure generally relates to artificial neural networks, and more particularly, to a system and method for a higher order long short-term memory (LSTM) network.

BACKGROUND

Applications for machine learning may be used in devices (e.g., a mobile device, a security device, and an autonomous vehicle) that provide object detection, classification and recognition in the area surrounding the device. Sequential modeling with long-term correlation has been a challenge to implement in machine learning. A typical approach, such as a hidden Markov model (HMM), requires an exponential increase in the number of states to improve long-term dependency requiring significant computing resources. Recent advances in implementations of deep neural networks have significantly improved the performance of language modeling, machine translation, machine vision and speech recognition. Among the various neural network models, a recurrent neural network (RNN) may capture long term dependency in sequential data with a simple recurrent mechanism. The architecture and computing resource complexity required to implement the RNN is significantly more efficient as compared with implementation of a traditional HMM.

However, proper training of an RNN network is extremely difficult due to vanishing/exploding gradients. The vanishing gradient problem is a difficulty found in training an RNN network with gradient-based learning methods and backpropagation. With a vanishing gradient, the error signal decreases exponentially and the early layers train very slowly. Instability may also occur with an exploding gradient in which the error signal increases exponentially. After many heuristic approaches have been applied to solve the RNN training problem, there have been a few successful deep neural network training architectures. Among them, a long short-term memory (LSTM) network is one of the most popular deep neural network architectures. The LSTM network provides learnable gate networks that may provide additional gradient paths in time. Therefore, depending on the state of the gate networks, some gradient paths may survive much longer than others, which may resolve the vanishing/exploding gradient problems.

Although the LSTM network provides promising results in many areas of machine learning and artificial intelligence, the LSTM network is based on a first-order recurrent network architecture. A first-order recurrent network architecture has limitations in modelling very long-term dependency of sequential data.

SUMMARY

An aspect of the present disclosure provides a system and method that includes a higher order long short-term memory (LSTM) network.

According to an aspect of the present disclosure, a method is provided which includes configuring a plurality of long short term memory (LSTM) networks, wherein each of the plurality of LSTM networks is at a different network layer, configuring a plurality of memory cells in a spatial domain of the plurality of LSTM networks, configuring the plurality of memory cells in a temporal domain of the plurality of LSTM networks, controlling an output of each of the plurality of LSTM networks based on highway connections to outputs from at least one previous layer and at least one previous time of the plurality of LSTM networks, and controlling the plurality of memory cells based on highway connections to memory cells from the at least one previous time.

According to another aspect of the present disclosure, an apparatus is provided which includes a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

According to another aspect of the present disclosure, a method of manufacturing a processor is provided which includes forming the processor as part of a wafer or package that includes at least one other processor, wherein the processor configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor which configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

BRIEF DESCRIPTION OF THE DRAWINGS

The above and other aspects, features and advantages of the present disclosure will become more apparent from the following detailed description, when taken in conjunction with the accompanying drawings, in which:

FIG. 4 illustrates a flowchart of a method of testing a processor configured to implement the present 2D HOLSTM network, according to one embodiment; and FIG. 5 illustrates a flowchart of a method of manufacturing a processor configured to implement the present 2D HOLSTM network, according to one embodiment.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and similarly, a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
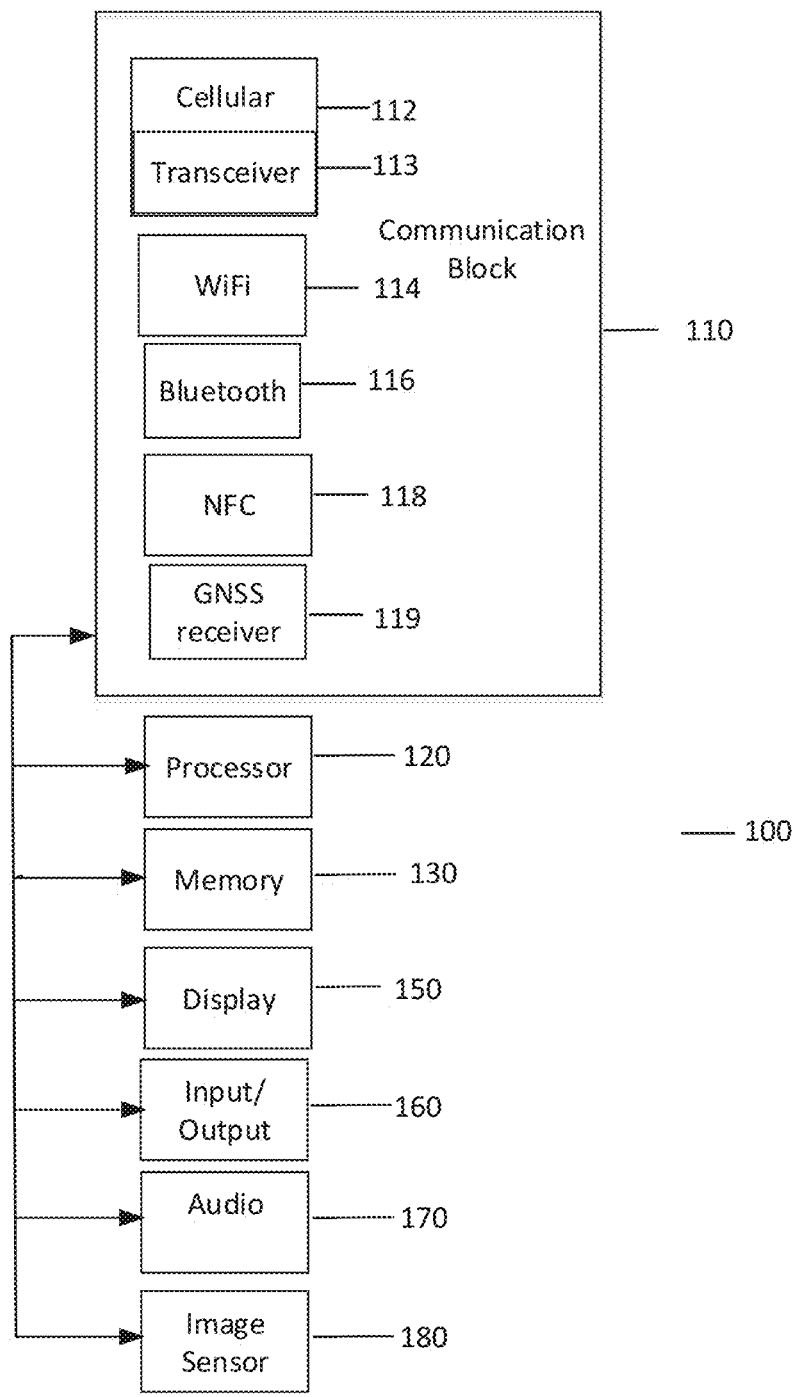
FIG. 1 illustrates a block diagram of an electronic device in a communication network, according to an embodiment of the present disclosure.

FIG. 1 illustrates a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170 and an image sensor 180. The electronic device 100 may be included in a portable electronic device including, but not limited to a smartphone, tablet or personal computer. The electronic device 100 may also be included in a vehicle, including but not limited to an automobile, a train, an airplane, an autonomous vehicle, a drone, a bicycle and a motorcycle.

The electronic device 100 includes a communication block 110 for connecting the device 100 to another electronic device or a network for communication of voice and data. The communication block 110 provides GPRS, EDGE, cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (Wi-Bro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 may support receiving signals from a satellite transmitter.

The electronic device 100 may receive electrical power for operating the functional blocks from a power supply, including, but not limited to a battery.

The processor 120 provides application layer processing functions of the electronic device 100. The processor 120 also provides command and control functionality for the various blocks in the electronic device 100. The processor 120 provides for updating control functions required by the functional blocks. The processor 120 may provide resources required by a HOLSTM network or a 2D HOLSTM network.

The memory 130 provides storage for device control program code, user data storage, application code and data storage. The memory 130 may provide data storage for the firmware, libraries, databases, lookup tables, algorithms, methods, and calibration data required by the cellular communications block 112. The memory 130 may provide storage for the images captured by the image sensor 180. The program code and databases required by the image sensor 180 may be loaded into local storage within the image sensor 180 from the memory 130 upon device boot up.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The image sensor 180 may capture both still and moving images. The image sensor 180 may capture images within the visible spectrum portion of the electromagnetic spectrum that is visible to the human eye. The image sensor 180 may also capture images outside the visible spectrum portion of the electromagnetic spectrum including infrared and ultraviolet. The image sensor 180 may be of a complementary metal oxide semiconductor (CMOS) type or a semiconductor charge coupled device (CCD) type and may include an image focusing lens and an image zoom function. The image sensor 180 may also include a memory, a local processor, and an interface to processor 120.

According to one embodiment, the present system and method provides higher-order generalization of a first-order LSTM network. Due to the complex structure of an LSTM network, multiple types of higher-order LSTM (HOLSTM) networks are provided by the present disclosure. The present system and method further provides a two dimensional (2D) HOLSTM network that provides higher-order connections in both spatial and temporal domains.

A higher-order RNN (HORNN) may include all the previous time steps from 1 to N, where N is the order of the HORNN. A HORNN may be generalized by allowing a sub-selection of time indices as shown in Equation (1):

$$h_t = g(\Sigma_{n \in selected\_set} W_{hn} h_{t-n} + W_{xh} x_t) \quad (1)$$

where $g(\cdot)$ is a nonlinear activation function such as a sigmoid or a rectified linear unit (ReLU), $h_t$ is a new state, $h_{t-1}$ is a previous state, $W_{hn}$ and $W_{xh}$ are weight matrices, and $x_t$ is an input.

Equation (1) above allows a HORNN to use a smaller number of recurrent feedback paths with higher order connections.

The present HOLSTM network provides multiple past histories to LSTM recurrent updates that assist in training long time dependency in the network. The LSTM network may be generalized as a HOLSTM network in the temporal domain. According to one embodiment, HOLSTM network equations may be modified so that all dependence on the new state, $h_t$ is replaced by a sub-set of the previous states, $h_{t-n}$.

According to one embodiment, the present HOLSTM network extends higher-order connections from an LSTM input path. The present HOLSTM network adds higher-order feedback paths to a memory cell recurrent input $j_t^{L+1}$ as shown in Equations (2) to (7):

$$\text{input gate } i_t^{L+1} = \text{sigm}(W_{xi}^{L+1} x_t^{L+1} + W_{hi}^{L+1} h_{t-1}^{L+1} + W_{ci}^{L+1} c_{t-1}^{L+1} + b_i^{L+1}) \quad (2)$$

$$\text{forget gate } f_t^{L+1} = \text{sigm}(W_{xf}^{L+1} x_t^{L+1} + W_{hf}^{L+1} h_{t-1}^{L+1} + W_{cf}^{L+1} c_{t-1}^{L+1} + b_f^{L+1}) \quad (3)$$

$$\text{new input } j_t^{L+1} = \tan h(W_{xc}^{L+1} x_t^{L+1} + \Sigma_{n \in selected\_set} W_{hn}^{L+1} j_{t-n}^{L+1} + b_j^{L+1}) \quad (4)$$

$$\text{cell activation register } c_t^{L+1} = f_t^{L+1} \odot c_{t-1}^{L+1} i_t^{L+1} \odot j_t^{L+1} \quad (5)$$

$$\text{cell output activation } o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1}) \quad (6)$$

$$\text{output gate } h_t^{L+1} = o_t^{L+1} \odot \tan h(c_t^{L+1}) \quad (7)$$

where L is a layer index, t is a time index, $c_t^{L+1}$ is an L+1$^{th}$ layer memory cell at time t, and $h_t^{L+1}$ is an L+1$^{th}$ layer LSTM output at time t.

Equation (4) above shows that higher-order feedback, $h_{t-n}^{L+1}$ is sub-sampled to be summed at $j_t^{L+1}$, which follows the generalization of HORNN in Equation (1) above. $j_t^{L+1}$ is further multiplied by the input gate for each element and then added to memory cell $c_t^{L+1}$. The higher-order feedback $h_{t-n}^{L+1}$ is sub-sampled to be summed at $j_t^{L+1}$, which is an input to the $c_t^{L+1}$ update.

According to one embodiment, the present HOLSTM network extends higher-order connections from internal cell memories. The present HOLSTM network uses $c_{t-n}^{l+1}$ a higher-order highway feedback instead of using $h_{t-n}^{L+1}$, following the principle of LSTM utilizing internal memory cells as a highway path in the temporal domain. The present HOLSTM modifies an internal memory structure for higher-order highway extension as shown in Equations (8) and (9):

$$c_t^{l+1} = \sum_{n \in selected\_set} f_{t,n}^{l+1} \odot c_{t-n}^{l+1} + i_t^{l+1} \odot \tanh(W_{xc}^{l+1} x_t^{l+1} + W_{hc}^{l+1} h_{t-1}^{l+1} + b_c^{l+1}) \quad (8)$$

$$f_{t,n}^{l+1} = \sigma(W_{xf,n}^{l+1} x_t^{l+1} + W_{hf,n}^{l+1} h_{t-n}^{l+1} + w_{cf,n}^{l+1} c_{t-n}^{l+1} + b_{f,n}^{l+1}) \text{ for} \quad (9)$$

$$n \in selected\_set$$

where $c_{t-n}^{l+1}$ is a recurrent highway path from t−n time step and $f_{t-n}^{l+1}$ is a corresponding gate network.

In one embodiment, the present HOLSTM network reuses input gate $i_t^{l+1}$ as a gate network for higher-order highway paths. Each parameter matrix $W_{nh}^{L+1}$ is used to scale a corresponding highway path. In a second embodiment, the present HOLSTM network provides a separate gate network for each highway path. Each gate network is trained the same as other gate networks. From a complexity point of view, the second embodiment requires training of more parameters because multiple parameter matrices are required for each gate network. However, from a structure point of view, the second embodiment provides more consistent architecture than the first embodiment because all highway paths are treated equally with gate networks.

According to one embodiment, the present HOLSTM network extends higher-order connections from a hybrid feedforward-recurrent deep neural network structure. The core idea of highway path idea is that a gate controls how much information to add from a new information source. If the highway gate is executed, the time highway gate from a previous time n* needs to be defined. According to one embodiment, the present HOLSTM modifies a hybrid LSTM network architecture with highway connection network so that the second gate m is from a previously chosen time −n*, rather than from another distant spatial input, by defining $p_t^{L*}$ in Equation (10):

$$p_t^{L*} = h_{t-n*}^{L+1} \quad (10)$$

The hybrid feedforward-recurrent deep neural network structure is described in U.S. patent application Ser. No. 15/343,882 titled "System and Method for Information Highways in a Hybrid Feedforward-Recurrent Deep Network", filed on Nov. 4, 2016. The rest of the hybrid feedforward-recurrent deep neural network structure equations remain the same where $m_t$ is an interpolation of a state between a previous state and a state at time t−n*, and is used with $x_t$ and cell contents $c_{t-1}$ to calculate the time highway gate $y_t$. In this method the hybrid feedforward-recurrent deep neural network structure provides two highway gates, one is a spatial highway gate and the other is temporal highway gate as defined in Equations (11) to (20):

$$\text{input } x_t^{L+1} = h_t^L \tag{11}$$

$$\text{input gate } i_t^{L+1} = \tan h(W_{xi}^{L+1} x_t^{L+1} + W_{hi}^{L+1} h_{t-1}^{L+1} + b_i^{L+1}) \tag{12}$$

$$\text{forget gate } f_t^{L+1} = \text{sigm}(W_{xf}^{L+1} x_t^{L+1} + W_{hf}^{L+1} h_{t-1}^{L+1} + b_f^{L+1}) \tag{13}$$

$$\text{new input register } j_t^{L+1} = \text{sigm}(W_{xc}^{L+1} x_t^{L+1} + W_{hc}^{L+1} h_{t-1}^{L+1} + b_j^{L+1}) \tag{14}$$

$$\text{cell output activation register } o_t^{L+1} = \tan h(W_{xo}^{L+1} x_t^{L+1} + W_{ho}^{L+1} h_{t-1}^{L+1} + b_o^{L+1}) \tag{15}$$

$$\text{highway gate } d_t^{L+1} = \text{sigm}(b_d^{L+1} + W_{xd}^{L+1} x_t^{L+1} + w_{cd}^{L+1} \odot c_{t-1}^{L+1} + w_{ld}^{L+1} \odot c_t^L) \tag{16}$$

$$\text{interpolation of state } m_t^{L+1} = \text{sigm}(W_{pm}^{L+1} p_t^{L*} + W_{hm}^{L+1} h_{t-1}^{L+1} + b_m^{L+1}) \tag{17}$$

$$\text{highway gate for a distant signal } p_t^{L*}, y_t^{L+1} = \text{sigm}(b_y^{L+1} + W_{xy}^{L+1} x_t^{L+1} + w_{cy}^{L+1} \odot c_{t-1}^{L+1} + w_{my}^{L+1} \odot m_t^{L+1}) \tag{18}$$

$$\text{cell activation register } c_t^{L+1} = f_t^{L+1} \odot c_{t-1}^{L+1} + i_t^{L+1} \odot j_t^{L+1} + d_t^{L+1} \odot c_t^L + y_t^{L+1} \odot m_t^{L+1} \tag{19}$$

$$\text{output gate } h_t^{L+1} = o_t^{L+1} \odot \tan h(c_t^{L+1}) \tag{20}$$

Equation (10) above may be changed so that the distant input is coming from cell contents at time t−n*, rather than the output at time t−n*. $p_t^{L*}$ may be then changed to Equation (21):

$$p_t^{L*} = c_{t-n^*}^{L+1} \tag{21}$$

In both cases above, where the distant input is coming from cell contents at 2 different time points, they can also be changed to use HOLSTM only, by dropping the spatial gate $p_t^{L*}$ if the spatial highway connection is not needed, and only the temporal highway gate is maintained. $h_{t-n}^{L+1}$ or $c_{t-n^*}^{L+1}$. may be used as a distant temporal highway path.

The present HORNN network and HOLSTM network may be extended into 2-dimensional higher-order RNN and 2-dimensional higher-order LSTM respectively. The extension is made by adding a higher-order spatial domain. Thus, the present HOLSTM network may be further generalized to a 2D HOLSTM network by providing higher-order connections on both the spatial and temporal domains. 2D highway paths may be sub-sampled to reduce the number of parameters in Equation (1) above. The spatial and temporal higher-order connections may be divided into separate variables or merged into common variables.

According to one embodiment, the present 2D-memory cell HOLSTM network reuses internal memory cells for both the spatial domain and the temporal domain. Therefore, a recurrent update in Equation (8) above may be changed by double summations for both time and spatial domains as shown in Equation (22):

$$c_t^{l+1} = \sum_{n=0}^{N} \sum_{k=1}^{l+1} f_{t,nk}^{l+1} \odot c_{t-n}^{k} + i_t^{l+1} \odot \tan h(W_{xc}^{l+1} x_t^{l+1} + W_{hc}^{l+1} h_{t-1}^{l+1} + b_c^{l+1}) \tag{22}$$

where n is an index for the temporal domain and k is an index for the spatial domain. Specifically, k refers to the $k^{th}$ layer of the network. The gate networks also need to be extended for the spatial domain as shown in Equation (23):

$$f_{t,nk}^{l+1} = \sigma(W_{xf,nk}^{l+1} x_t^{l+1} + W_{hf,nk}^{l+1} h_{t-n}^{k+1} + w_{cf,nk}^{l+1} c_{t-n}^{k+1} + b_{f,n}^{l+1}) \text{ for} \tag{23}$$

$$n = 0, \ldots, N \text{ and } k = 1, \ldots, l+1$$

Here, $f_{t,0(l+1)}^{l+1}$ is always zero because self-loop is not possible without solving Equation (22). Furthermore, as described above, n and k may also be selected from a pre-determined sub-set of values.

The remaining updated equations are shown in Equations (24)-(28):

$$i_t^{l+1} = \sigma(W_{xi}^{l+1} x_t^{l+1} + W_{hi}^{l+1} h_{t-i}^{l+1} + w_{ci}^{l+1} c_{t-1}^{l+1} + b_i^{l+1}) \tag{24}$$

$$o_t^{l+1} = \sigma(W_{xo}^{l+1} x_t^{l+1} + W_{ho}^{l+1} h_{t-1}^{l+1} + W_{co}^{l+1} c_t^{l+1} + b_o^{l+1}) \tag{25}$$

$$r_t^{l+1} = \tan h(c_t^{l+1}) \tag{26}$$

$$m_t^{l+1} = W_p^{l+1} \cdot r_t^{l+1} \tag{27}$$

$$h_t^{l+1} = o_t \odot m_t^{l+1} \tag{28}$$

The present 2D-memory cell HOLSTM reuses internal memory cells for both the temporal domain and the spatial domain. Since a single instance of memory cells needs to handle both the temporal domain and the spatial domain vanishing/exploding gradients, network training may be more challenging for a higher-order LSTM.

According to one embodiment, the present accumulated 2D HOLSTM network separates temporal domain and spatial domain recurrent updates by using different update variables, which may improve network training. The recurrent update for accumulated 2D HOLSTM is shown in Equations (29) and (30):

$$c_t^{l+1} = \sum f_{t,n}^{l+1} \odot c_{t-n}^{l+1} + i_t^{l+1} \odot \tan h(W_{xc}^{l+1} x_t^{l+1} + b_c^{l+1}) \tag{29}$$

$$h_t^{l+1} = o_t \odot (m_t^{l+1} + \sum_{n=0}^{N} \sum_{k=l+1-m}^{l} W_{hn,l+1}^{k} h_{t-n}^{k}) \tag{30}$$

Equation (29) shows that higher-order accumulation in the temporal domain is performed in memory cell $c_t^{l+1}$. For a spatial-domain highway connection, $h_t^{l+1}$ accumulates all prior time and layer highway paths according to Equation (30). The remaining updated equations are shown in Equations (31)-(34):

$$i_t^{l+1} = \sigma(W_{xi}^{l+1} x_t^{l+1} + W_{hi}^{l+1} h_{t-i}^{l+1} + w_{ci}^{l+1} c_{t-1}^{l+1} + b_i^{l+1}) \tag{31}$$

$$o_t^{l+1} = \sigma(W_{xo}^{l+1} x_t^{l+1} + W_{ho}^{l+1} h_{t-1}^{l+1} + W_{co}^{l+1} c_t^{l+1} + b_o^{l+1}) \tag{32}$$

$$r_t^{l+1} = \tan h(c_t^{l+1}) \tag{33}$$

$$m_t^{l+1} = W_p^{l+1} \cdot r_t^{l+1} \tag{34}$$

Figure 2:
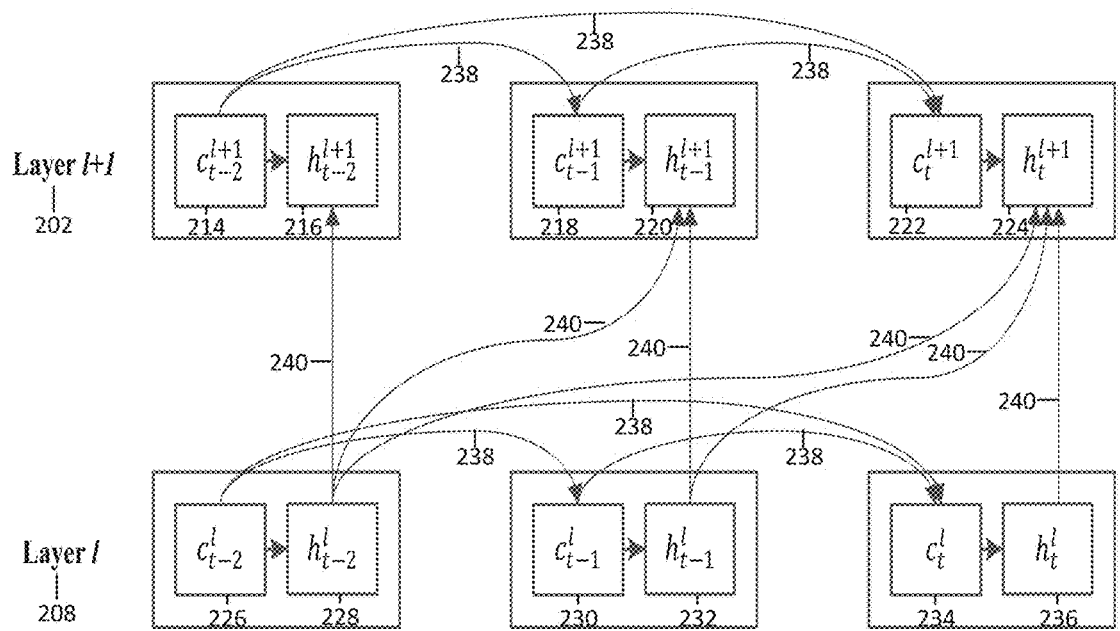
FIG. 2 illustrates an exemplary diagram of accumulated/non-accumulated two dimensional (2D) higher order long short-term memory (HOLSTM) artificial neural network, according to one embodiment.

FIG. 2 illustrates an exemplary diagram of accumulated/non-accumulated 2D HOLSTM network, according to one embodiment.

Referring to FIG. 2, an accumulated/non-accumulated 2D HOLSTM network includes layer l+1 202, layer 1 208, temporal domain highway connections 238, spatial domain highway connections 240, $h_{t-2}^{l+1}$ 216 is an output from layer l+1 at time t−2, $h_{t-1}^{l+1}$ 220 is an output from layer l+1 at time t−1, $h_t^{l+1}$ 224 is an output from layer l+1 at time t. $h_{t-2}^{l}$ 228 is an output from layer l at time t−2, $h_{t-1}^{l}$ 232 is an output from layer l at time t−1, $h_t^{l}$ 236 is an output from layer l at time t. $c_{t-2}^{l+1}$ 214 is a memory cell in layer l+1 at time t−2, $c_{t-1}^{l+1}$ 218 is a memory cell in layer l+1 at time t−1, $c_t^{l+1}$ 222 is a memory cell in layer l+1 at time t. $c_{t-2}^{l}$ 226 is a memory cell in layer l at time t−2, $c_{t-1}^l$ 230 is a memory cell in layer l at time t−1, $c_t^l$ 234 is a memory cell in layer l at time t.

According to one embodiment, output $h_t^{l+1}$ 224 accumulates $h_t^l$ 236 from previous layer l 208, $h_{t-1}^l$ 232 from previous layer l 208 and $h_{t-2}^l$ 228 from the previous layer l using spatial domain highway connection 240. Output $h_{t-1}^{l+1}$ 220 accumulates $h_{t-1}^l$ 232 from previous layer l 208 and $h_{t-2}^l$ 228 from previous layer l 208 using spatial domain highway connection 240. Output $h_{t-2}^{l+1}$ 216 accumulates $h_{t-2}^l$ 228 from previous layer l 208 using spatial domain highway connection 240.

According to one embodiment, memory cell $c_t^{l+1}$ 222 accumulates $c_{t-1}^{l+1}$ 218 from previous time t−1 and $c_{t-2}^{l+1}$ 214 from previous time t−2 using temporal domain highway connection 238. Memory cell $c_{t-1}^{l+1}$ 218 accumulates $c_{t-2}^{l+1}$ 214 from previous time t−2 using temporal domain highway connection 238. Memory cell $c_t^l$ 234 accumulates $c_{t-1}^l$ 230 from previous time t−1 and $c_{t-2}^l$ 226 from previous time t−2 using temporal domain highway connection 238. Memory cell $c_{t-1}^l$ 230 accumulates $c_{t-2}^l$ 226 from previous time t−2 using temporal domain highway connection 238.

According to one embodiment, the present non-accumulated 2D HOLSTM network provides spatial domain addition at the LSTM input that is different from the present accumulated 2D HOLSTM network. However, the present non-accumulated 2D HOLSTM network architecture also reuses internal memory cells for both spatial and temporal domain highway connections, which may have a similar training challenge as 2-D memory cell HOLSTM. The recurrent equations may be described in Equations (35) and (36):

$$c_t^{l+1} = \sum_{n=1}^{N} f_{t,n}^{l+1} \odot c_{t-n}^{l+1} + \qquad (35)$$

$$i_t^{l+1} \odot \tanh\left(W_{xc}^{l+1} x_t^{l+1} + \sum_{n=0}^{N}\sum_{k=l+1-m}^{l} W_{hn,l+1}^k h_{t-n}^k + b_c^{l+1}\right)$$

$$f_{t,n}^{l+1} = \sigma(W_{xf,n}^{l+1} x_t^{l+1} + W_{hf,n}^{l+1} h_{t-n}^{l+1} + w_{cf,n}^{l+1} c_{t-n}^{l+1} + b_{f,n}^{l+1}) \text{ for} \qquad (36)$$

$$n = 1, \ldots, N$$

In Equation (35), $c_t^{l+1}$ has temporal highway paths from $c_{t-n}^{l+1}$ and spatial highway paths from tangent hyperbolic of $h_{t-n}^k$.

Figure 3:
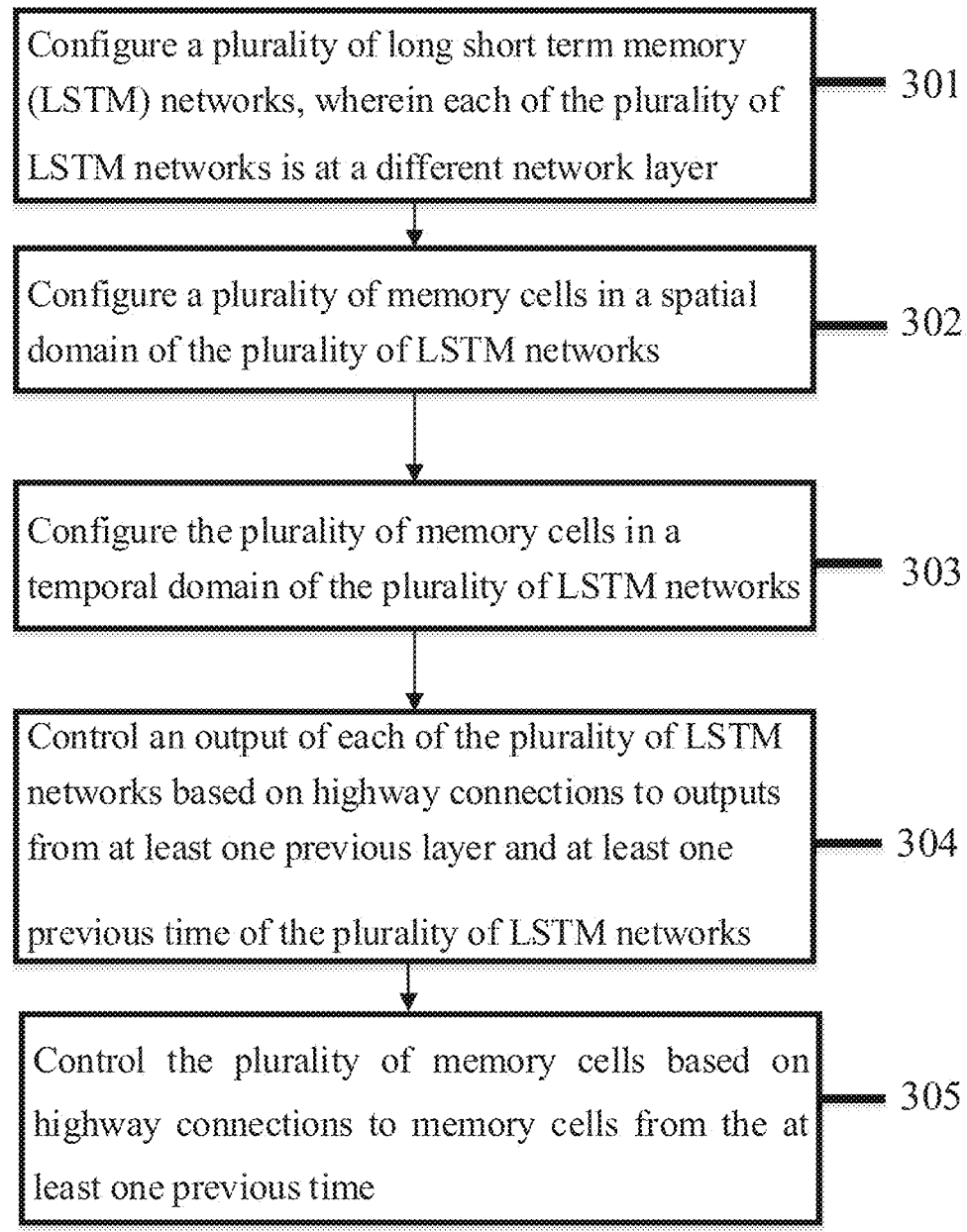
FIG. 3 illustrates an exemplary flowchart of the present 2D HOLSTM network, according to one embodiment.

FIG. 3 illustrates an exemplary flowchart of the present 2D HOLSTM network, according to one embodiment.

Referring to FIG. 3, at 301, the present 2D HOLSTM configures a plurality of long short term memory (LSTM) networks, wherein each of the plurality of LSTM networks is at a different network layer. At 302, the present 2D HOLSTM configures a plurality of memory cells in a spatial domain of the plurality of LSTM networks. At 303, the present 2D HOLSTM configures the plurality of memory cells in a temporal domain of the plurality of LSTM networks. At 304, the present 2D HOLSTM controls an output of each of the plurality of LSTM networks based on highway connections to outputs from at least one previous layer and at least one previous time of the plurality of LSTM networks. At 305, the present 2D HOLSTM controls the plurality of memory cells based on highway connections to memory cells from the at least one previous time.

FIG. 4 illustrates a flowchart of a method of testing a processor configured to implement the present 2D HOLSTM network, according to one embodiment. The processor may be implemented in hardware or implemented in hardware that is programmed with software.

Referring to FIG. 4, the method, at 401, forms the processor as part of a wafer or package that includes at least one other processor. The processor configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

At 403, the method tests the processor. Testing the processor includes testing the processor and the at least one other processor using one or more electrical to optical converters, one or more optical splitters that split an optical signal into two or more optical signals, and one or more optical to electrical converters.

FIG. 5 illustrates a flowchart of a method of manufacturing a processor configured to implement the present 2D HOLSTM network, according to one embodiment.

Referring to FIG. 5, the method, at 501, includes an initial layout of data in which the method generates a mask layout for a set of features for a layer of an integrated circuit. The mask layout includes standard cell library macros for one or more circuit features that include a processor. The processor configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

At 503, there is a design rule check in which the method disregards relative positions of the macros for compliance to layout design rules during the generation of the mask layout.

At 505, there is an adjustment of the layout in which the method checks the relative positions of the macros for compliance to layout design rules after generating the mask layout.

At 507, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the scope of the present disclosure as defined by the appended claims and their equivalents.

What is claimed is:

1. A method, comprising:
   configuring a plurality of long short term memory (LSTM) networks, wherein each of the plurality of LSTM networks is at a different network layer;
   configuring a plurality of memory cells in a spatial domain of the plurality of LSTM networks;
   configuring the plurality of memory cells in a temporal domain of the plurality of LSTM networks;
   controlling an output of each of the plurality of LSTM networks based on highway connections to outputs from at least one previous layer and at least one previous time of the plurality of LSTM networks; and
   controlling the plurality of memory cells based on highway connections to memory cells from the at least one previous time.

2. The method of claim 1, further comprising configuring the plurality of memory cells in the spatial domain and configuring the plurality of memory cells in the temporal domain using separate variables.

3. The method of claim 2, wherein configuring the plurality of memory cells in the temporal domain is based on a function block $c_t^{L+1} = f_t^{L+1} \odot c_{t-1}^{L+1} + i_t^{L+1} \odot j_t^{L+1}$, wherein $f_t^{L+1}$ is a gate network, $c_{t-1}^{L+1}$ is a cell activation of the previous time in one of the plurality of LSTM networks, $i_t^{L+1}$ is an input gate in the one of the plurality of LSTM networks, and $j_t^{L+1} = \tan h(W_{xc}^{L+1} x_t^{L+1} + \Sigma_{n \in selected_{set}} W_{hn}^{L+1} h_{t-n}^{L+1} + b_j^{L+1})$, wherein n is an index for the temporal domain, $W_{xc}^{L+1}$ is a first weight matrix of the one of the plurality of LSTM networks, $x_t^{L+1}$ is an input in the one of the plurality of LSTM networks, $W_{hn}^{L+1}$ is a second weight matrix of the one of the plurality of LSTM networks, $h_{t-n}^{L+1}$ is an output gate of the at least one previous time in the one of the plurality of LSTM networks, and $b_j^{L+1}$ is a learnable bias value of the one of the plurality of LSTM networks.

4. The method of claim 2, wherein configuring the plurality of memory cells in the temporal domain is based on a function block $c_t^{l+1} = \Sigma_{n=1}^{N} f_{t,n}^{l+1} \odot c_{t-n}^{l+1} + i_t^{l+1} \odot \tan h(W_{xc}^{l+1} x_t^{l+1} + W_{hc}^{l+1} h_{t-1}^{l+1} + b_c^{l+1})$, wherein n is an index for the temporal domain, $f_{t,n}^{l+1}$ is a gate network, $c_{t-n}^{l+1}$ is a cell activation of the at least one previous time in one of the plurality of LSTM networks, $i_t^{l+1}$ is an input gate in the one of the plurality of LSTM networks, $W_{xc}^{l+1}$ is a weight matrix of the one of the plurality of LSTM networks, $x_t^{l+1}$ is an input in the one of the plurality of LSTM networks, and $b_c^{l+1}$ is a pre-determined bias value of the one of the plurality of LSTM networks.

5. The method of claim 2, wherein configuring the plurality of memory cells in the spatial domain is based on a function block $h_t^{l+1} = o_t \odot (m_t^{l+1} + \Sigma_{n=0}^{N} \Sigma_{k=l+1-m}^{l} W_{hn,l+1}^{k} h_{t-n}^{k})$ wherein $o_t$ is a cell output activation, $m_t^{l+1}$ is an interpolation of a state between a previous state and a state at time t−n, n is an index for the temporal domain, k is an index for the spatial domain, $W_{hn,l+1}^{k}$ is a weight matrix of the one of the plurality of LSTM networks, $h_{t-n}^{k}$ is an output gate of the at least one previous time in the one of the plurality of LSTM networks.

6. The method of claim 2, wherein configuring the plurality of memory cells in the spatial domain is based on a function block $c_t^{l+1} = \Sigma_{n=1}^{N} f_{t,n}^{l+1} \odot c_{t-n}^{l+1} + i_t^{l+1} \odot \tan h(W_{xc}^{l+1} x_t^{l+1} + \Sigma_{n=0}^{N} \Sigma_{k=l+1-m}^{l} W_{hn,l+1}^{k} h_{t-n}^{k} + b_c^{l+1})$, wherein $f_{t,n}^{l+1}$ is a gate network, $c_{t-n}^{l+1}$ is a cell output activation, n is an index for the temporal domain, k is an index for the spatial domain, $W_{xc}^{l+1} x_t^{l+1}$ is a weight matrix of the one of the plurality of LSTM networks, $h_{t-n}^{k}$ is an output gate of the at least one previous time in the one of the plurality of LSTM networks, and $b_c^{l+1}$ is a pre-determined bias value of the one of the plurality of LSTM networks.

7. The method of claim 1, further comprising combining variables for configuring the plurality of memory cells in the spatial domain and configuring the plurality of memory cells in the temporal domain, wherein the configuring is based on a function block $c_t^{l+1} = \Sigma_{n=0}^{N} \Sigma_{k=1}^{l+1} f_{t,nk}^{l+1} \odot c_{t-n}^{k} + i_t^{l+1} \odot \tan h(W_{xc}^{l+1} x_t^{l+1} + W_{hc}^{l+1} h_{t-1}^{l+1} + b_c^{l+1})$, wherein n is an index for the temporal domain, k is an index for the spatial domain, $f_{t,nk}^{l+1}$ is a gate network, $c_{t-n}^{k}$ is a cell activation of the at least one previous time in one of the plurality of LSTM networks, $i_t^{l+1}$ is an input gate in the one of the plurality of LSTM networks, $W_{xc}^{l+1}$ is a weight matrix of the one of the plurality of LSTM networks, $x_t^{l+1}$ is an input in the one of the plurality of LSTM networks, and $b_c^{l+1}$ is a pre-determined bias value of the one of the plurality of LSTM networks.

8. A method, comprising:
   configuring a plurality of long short term memory (LSTM) networks, wherein each of the plurality of LSTM networks is at a different network layer;
   configuring a plurality of memory cells in a temporal domain of the plurality of LSTM networks, wherein each of the plurality of LSTM networks includes at least one higher-order feedback path to a memory cell recurrent input;
   controlling an output of each of the plurality of LSTM networks based on highway connections to outputs from at least one previous layer and at least one previous time of the plurality of LSTM networks; and
   controlling the plurality of memory cells based on highway connections to memory cells from the at least one previous time.

9. The method of claim 8, wherein an input gate $i_t^{l+1}$ is used as a gate network for the at least one higher-order feedback path, the at least one higher-order feedback path is from an internal cell memory function block $c_{t-n}^{l+1}$, the at least one higher-order feedback path is from a spatial domain gate function block $p_{t}^{L*} = h_{t-n*}^{L+1}$, $m_t^{L+1}$ is an interpolation of a state $= sigm(\Sigma_{n \in selected\_set} W_{pm,n}^{L+1} p_{t,n}^{L*} + W_{hm}^{L+1} h_{t-1}^{L+1} + b_m^{L+1})$, and $c_t^{L+1} = f_t^{L+1} \odot c_{t-1}^{L+1} + i_t^{L+1} \odot j_t^{L+1} + d_t^{L} \odot c_t^{L} + y_t^{L+1} \odot m_t^{L+1}$, wherein t is a present time index, l is an index for each of the plurality of LSTM networks, n is an index for a previous time, h is an output gate from layer L+1 of the plurality of LSTM networks at time t−n*, $W_{pm}^{L+1}$ is a first weight matrix of the one of the plurality of LSTM networks, $W_{hm}^{L+1}$ is a second weight matrix of the one of the plurality of LSTM, networks, $h_{t-n}^{L+1}$ is an output gate of the at least one previous time in the one of the plurality of LSTM networks, and $b_j^{L+1}$ is a learnable bias value of the one of the plurality of LSTM networks.

10. An apparatus, comprising:
    a plurality of long short term memory (LSTM) networks, wherein each of the plurality of LSTM networks is at a different network layer,
    wherein a plurality of memory cells are configured in a spatial domain of the plurality of LSTM networks,
    wherein the plurality of memory cells are configured in a temporal domain of the plurality of LSTM networks,
    wherein an output of each of the plurality of LSTM networks is controlled based on highway connections to outputs from at least one previous layer and at least one previous time of the plurality of LSTM networks, and
    wherein the plurality of memory cells are controlled based on highway connections to memory cells from the at least one previous time.

11. The apparatus of claim 10, wherein each LSTM network is further configured to configure the plurality of memory cells in the spatial domain and configure the plurality of memory cells in the temporal domain using separate variables.

12. The apparatus of claim 11, wherein configuring the plurality of memory cells in the temporal domain is based on a function block $c_t^{L+1}=f_t^{L+1}\odot c_{t-1}^{L+1}+i_t^{L+1}\odot j_t^{L+1}$, wherein $f_t^{L+1}$ is a gate network, $c_{t-1}^{L+1}$ is a cell activation of the previous time in one of the plurality of LSTM networks, $i_t^{L+1}$ is an input gate in the one of the plurality of LSTM networks, and $j_t^{L+1}=\tan h(W_{xc}^{L+1}x_t^{L+1}+\Sigma_{n\in selected_{set}}W_{hn}^{L+1}h_{t-n}^{L+1}+b_j^{L+1})$, wherein n is an index for the temporal domain, $W_{xc}^{L+1}$ is a first weight matrix of the one of the plurality of LSTM networks, $x_t^{L+1}$ is an input in the one of the plurality of LSTM networks, $W_{hn}^{L+1}$ is a second weight matrix of the one of the plurality of LSTM networks, $h_{t-n}^{L+1}$ is an output gate of the at least one previous time in the one of the plurality of LSTM networks, and $b_j^{L+1}$ is a learnable bias value of the one of the plurality of LSTM networks.

13. The apparatus of claim 11, wherein configuring the plurality of memory cells in the temporal domain is based on a function block $c_t^{l+1}=\Sigma_{n=1}^{N}f_{t,n}^{l+1}\odot c_{t-n}^{l+1}+i_t^{l+1}\odot \tan h(W_{xc}^{l+1}x_t^{l+1}+W_{hc}^{l+1}h_{t-1}^{l+1}+b_c^{l+1})$, wherein n is an index for the temporal domain, $f_{t,n}^{l+1}$ is a gate network, $c_{t-n}^{l+1}$ is a cell activation of the at least one previous time in one of the plurality of LSTM networks, $i_t^{l+1}$ is an input gate in the one of the plurality of LSTM networks, $W_{xc}^{l+1}$ is a weight matrix of the one of the plurality of LSTM networks, $x_t^{l+1}$ is an input in the one of the plurality of LSTM networks, and $b_c^{l+1}$ is a pre-determined bias value of the one of the plurality of LSTM networks.

14. The apparatus of claim 11, wherein configuring the plurality of memory cells in the spatial domain is based on a function block $h_t^{l+1}=o_t\odot(m_t^{l+1}+\Sigma_{n=0}^{N}\Sigma_{k=l+1-m}^{l}W_{hn,l+1}^{k}h_{t-n}^{k})$, wherein $o_t$ is a cell output activation, $m_t^{l+1}$ is an interpolation of a state between a previous state and a state at time t–n, n is an index for the temporal domain, k is an index for the spatial domain, $W_{hn,l+1}^{k}$ is a weight matrix of the one of the plurality of LSTM networks, $h_{t-n}^{k}$ is an output gate of the at least one previous time in the one of the plurality of LSTM networks.

15. The apparatus of claim 11, wherein configuring the plurality of memory cells in the spatial domain is based on a function block $c_t^{l+1}=\Sigma_{n=1}^{N}f_{t,n}^{l+1}\odot c_{t-n}^{l+1}+i_t^{l+1}\odot \tan h(W_{xc}^{l+1}x_t^{l+1}+\Sigma_{n=0}^{N}\Sigma_{k=l+1-m}^{l}W_{hn,l+1}^{k}h_{t-n}^{k}+b_c^{l+1})$, wherein $f_{t,n}^{l+1}$ is a gate network, $c_{t-n}^{l+1}$ is a cell output activation, n is an index for the temporal domain, k is an index for the spatial domain, $W_{xc}^{l+1}x_t^{l+1}$ is a weight matrix of the one of the plurality of LSTM networks, $h_{t-n}^{k}$ is an output gate of the at least one previous time in the one of the plurality of LSTM networks, and $b_c^{l+1}$ is a pre-determined bias value of the one of the plurality of LSTM networks.

16. The apparatus of claim 10, wherein each LSTM network is further configured to combine variables for configuring the plurality of memory cells in the spatial domain and configuring the plurality of memory cells in the temporal domain, wherein the configuring is based on a function block $c_t^{l+1}=\Sigma_{n=0}^{N}\Sigma_{k=1}^{l+1}f_{t,nk}^{l+1}\odot c_{t-n}^{k}+i_t^{l+1}\odot \tan h(w_{xc}^{l+1}x_t^{l+1}+W_{hc}^{l+1}h_{t-1}^{l+1}+b_c^{l+1})$, wherein n is an index for the temporal domain, k is an index for the spatial domain, $f_{t,nk}^{l+1}$ is a gate network, $c_{t-n}^{k}$ is a cell activation of the at least one previous time in one of the plurality of LSTM networks, $i_t^{l+1}$ is an input gate in the one of the plurality of LSTM networks, $W_{xc}^{l+1}$ is a weight matrix of the one of the plurality of LSTM networks, $x_t^{l+1}$ is an input in the one of the plurality of LSTM networks, and $b_c^{l+1}$ is a pre-determined bias value of the one of the plurality of LSTM networks.

17. An apparatus, comprising:
a plurality of long short term memory (LSTM) networks, wherein each of the plurality of LSTM networks is at a different network layer,
wherein configuring a plurality of long short term memory (LSTM) networks,
wherein a plurality of memory cells are configured in a temporal domain of the plurality of LSTM networks,
wherein each of the plurality of LSTM networks includes at least one higher-order feedback path to a memory cell recurrent input,
wherein an output of each of the plurality of LSTM networks is controlled based on highway connections to outputs from at least one previous layer and at least one previous time of the plurality of LSTM networks, and
wherein the plurality of memory cells are controlled based on highway connections to memory cells from the at least one previous time.

18. The apparatus of claim 17, wherein an input gate $i_t^{l+1}$ is used as a gate network for the at least one higher-order feedback path, the at least one higher-order feedback path is from an internal cell memory function block $c_{t-n}^{l+1}$, the at least one higher-order feedback path is from a spatial domain gate function block $p_t^{L*}=h_{t-n*}^{L+1}$, $m_t^{L+1}$ is an interpolation of a state=$sigm(\Sigma_{n\in selected\_set}W_{pm,n}^{L+1}p_{t,n}^{L*}+W_{hm}^{L+1}h_{t-1}^{L+1}+b_m^{L+1})$, and $c_t^{L+1}=f_t^{L+1}\odot c_{t-1}^{L+1}+i_t^{L+1}\odot j_t^{L+1}+d_t^{L+1}\odot c_t^{L}+y_t^{L+1}\odot m_t^{L+1}$, wherein t is a present time index, l is an index for each of the plurality of LSTM networks, n is an index for a previous time, h is an output gate from layer L+1 of the plurality of LSTM networks at time t−n*, $W_{pm}^{L+1}$ is a first weight matrix of the one of the plurality of LSTM networks, $W_{hm}^{L+1}$ is a second weight matrix of the one of the plurality of LSTM networks, $h_{t-n}^{L+1}$ is an output gate of the at least one previous time in the one of the plurality of LSTM networks, and $b_j^{L+1}$ is a learnable bias value of the one of the plurality of LSTM networks.

19. A method of manufacturing a processor, comprising:
forming the processor as part of a wafer or package that includes at least one other processor, wherein the processor configures a plurality of long short term memory (LSTM) networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time; and
testing the processor, which includes testing the processor and at least one other processor using one or more electrical to optical converters, one or more optical splitters that split an optical signal into two or more optical signals, and one or more optical to electrical converters.

20. A method of constructing an integrated circuit, comprising:
generating a mask layout for a set of features for a layer of the integrated circuit, wherein the mask layout includes standard cell library macros for one or more circuit features that include a processor which configures a plurality of long short term memory (LSTM)

networks, wherein each of the plurality of LSTM networks is at a different network layer, wherein a plurality of memory cells are configured in a spatial domain of the plurality of LSTM networks, wherein the plurality of memory cells are configured in a temporal domain of the plurality of LSTM networks, wherein an output of each of the plurality of LSTM networks is controlled based on highway connections to outputs from at least one previous layer and at least one previous time of the plurality of LSTM networks, and wherein the plurality of memory cells are controlled based on highway connections to memory cells from the at least one previous time.

\* \* \* \* \*